United States Patent
Traver, Jr. et al.

[11] Patent Number: 6,151,430
[45] Date of Patent: Nov. 21, 2000

[54] PHOTONIC DEVICE HAVING AN INTEGAL GUIDE AND METHOD OF MANUFACTURING

[75] Inventors: Robert F. Traver, Jr., Landenberg, Pa.; Theodore D. Lowes, Lompoc, Calif.; Mark N. Donhowe, Newark, Del.; Sean P. Kilcoyne, Lompoc, Calif.

[73] Assignee: Gore Enterprise Holdings, Inc., Newark, Del.

[21] Appl. No.: 09/111,943

[22] Filed: Jul. 8, 1998

[51] Int. Cl.[7] ...................................................... G02B 6/12
[52] U.S. Cl. .................................. 385/14; 385/49; 385/50; 385/65; 385/83
[58] Field of Search .................................. 385/14, 49, 50, 385/65, 83, 88, 92, 52

[56] References Cited

U.S. PATENT DOCUMENTS

| | | | |
|---|---|---|---|
| 4,307,935 | 12/1981 | Monnier | 350/96.2 |
| 4,779,946 | 10/1988 | Pimpinella et al. | 350/96.2 |
| 4,826,275 | 5/1989 | Pimpinella et al. | 350/96.2 |
| 4,882,245 | 11/1989 | Gelorme et al. | 430/14 |
| 5,355,386 | 10/1994 | Rothman et al. | 372/50 |
| 5,359,687 | 10/1994 | McFarland et al. | 385/49 |
| 5,420,954 | 5/1995 | Swirhun et al. | 385/92 |
| 5,466,558 | 11/1995 | Sasaki | 430/321 |
| 5,526,454 | 6/1996 | Mayer | 385/49 |
| 5,631,988 | 5/1997 | Swirhun et al. | 385/89 |
| 5,644,667 | 7/1997 | Tabuchi | 385/49 |

FOREIGN PATENT DOCUMENTS

97/02501  1/1997  WIPO .

OTHER PUBLICATIONS

"Mechanical Characterization of a New High–Aspect–Ratio Near UV–Photoresist", Lorenz et al., Date and Publication Unknown.

"Micromachining applications of a high resolution ultratick photoresist", Lee et al., J. Vac. Soc. Technol. B., vol. 13, No. 6, Aug. 1995, pp. 3012–3016.

"Nano0 SU–8 Resist" Product Information, Microlithography Chemical Corp., Mar. 28, 1997.

Book—Optoelectrics For Data Communication, Radcliffe et al., 1995, pp. 160–163.

*Primary Examiner*—Phan T. H. Palmer
*Attorney, Agent, or Firm*—Victor M. Genco, Jr.

[57] ABSTRACT

A process is provided for creating microstructure coupling guides for aligning photonic devices with optical signal carrying apparatuses. The process includes applying a photoresist to a semiconductor material, spinning the semiconductor material, baking the semiconductor material, exposing the photoresist, baking the semiconductor material a second time, and developing the resist. The process creates a microstructure that acts as an integral guide to align and maintain the relative position between an optical signal carrying apparatus and a photonic device.

28 Claims, 10 Drawing Sheets

PHOTONIC DEVICE HAVING AN INTEGAL GUIDE AND METHOD OF MANUFACTURING

FIELD OF THE INVENTION

The present invention relates generally to a wafer scale integrated coupling guide for use in photonic devices. More particularly, one embodiment of the present invention relates to the use of polymers, especially an epoxidized novolak (novolac epoxy), in the manufacturing of guide structures on photonic semiconductor wafers.

BACKGROUND OF THE INVENTION

In the area of opto-electronic packages, it is generally accepted that the most time consuming and costly component of the package is the alignment of the optical fiber, or waveguide, to the semiconductor emitter or receiver. The traditional approach to this alignment requires that the two parts be micromanipulated relative to each other while one is operating and the other is monitoring coupled light. Once the desired amount of coupled light is attained, the two parts must be affixed in place in such a way as to maintain this alignment for the life of the product. This process, commonly referred to as active alignment, can be slow and given to poor yields stemming from the micromanipulation and the need to permanently affix the two objects without causing any relative movement of the two with respect to each other.

To alleviate this problem, opto-electronic package designs have been suggested which incorporate passive alignment techniques. These designs do not require activation of the opto-electronic device. Generally, they rely on some mechanical features on the laser and the fiber as well as some intermediate piece for alignment. By putting the pieces together with some adhesion mechanism, alignment can be secured and maintained for the life of the component. Typical of this technology is the silicon optical bench design. In this design, the laser is aligned via solder or registration marks to an intermediate piece, a silicon part, which has mechanical features—"v-grooves" —which facilitate alignment of an optical fiber. The drawbacks to this design are the number of alignments in the assembly process and the cost of the intermediate component. Additionally, these designs can be difficult to use with surface emitting/receiving devices because of the need to redirect the light coupled through the system.

Other approaches have been suggested which do not incorporate a silicon intermediate structure. Swirhun et al. (U.S. Pat. No. 5,631,988) suggests that defined features in a surface emitting laser array could be used as an alignment means for a structure that holds embedded optical fibers. This third structure adds complexity and adds to the overall tolerance scheme for the alignment system.

In other prior art, attempts have been made to cope with the dilemma of adding intermediate parts and their associated costs and tolerances. Matsuda (U.S. Pat. No. 5,434,939) suggests a design that allows direct fiber coupling to a laser by way of a guiding hole feature in the backside of the actual laser substrate. The precision with which such guiding holes can be manufactured is not currently adequate for reliable coupling. Additionally, the process of making a hole in the actual laser substrate can weaken an already fragile material. Furthermore, this design is not appropriate when it is desired to have light emit from the top surface of the opto-electronic device, commonly called a top emitter in the vernacular of the industry. In contrast, a bottom emitter is a photonic device wherein the emitted light propagates through the substrate and out the bottom surface of the device.

What is needed is a photonic device that allows direct passive alignment and attachment of an optical signal carrying apparatus, such as an optical fiber for example, via robust guide features formed integrally on the surface of the photonic device. This photonic device would enable precise positioning of the fiber relative to the active region with the potential for sub-micron alignment accuracy without the addition of interfacial alignment components. Furthermore, it would be advantageous if the fabrication method for the above is compatible with standard semiconductor processing equipment.

SUMMARY OF THE INVENTION

In one embodiment of the present invention, a wafer scale polymer defining process is provided as well as an apparatus that uses a resist or photoresist to form microstructures for forming coupling guides on photonic devices.

It is an object of this invention to provide an article that comprises a photonic device having an integral polymeric guide.

It is a further object of this invention to provide an article comprising a photonic device with a plated guide, wherein the plated guide is formed in an opening in a resist prior to the resist being removed.

It is a further object of the invention to provide a photonic device with an integral guide formed from a photo-imagable polymer material.

It is a further object of this invention to provide a method of preparing a photonic device with an integral guide formed from a polymer material.

It is a further object of this invention to provide a method of preparing a guide on a photonic device comprising the steps of applying a resist, transferring an image to the resist, and developing the image.

It is a further object of this invention to provide a method of preparing a plated guide on a photonic device comprising the steps of applying a resist, transferring an image to the resist, developing the image, plating the resist, and removing the resist.

BRIEF DESCRIPTION OF THE DRAWINGS

The present invention is illustrated by way of example and not limitation in the accompanying figures. In the figures, like reference numerals indicate similar elements.

DETAILED DESCRIPTION OF INVENTION

Figure 1:
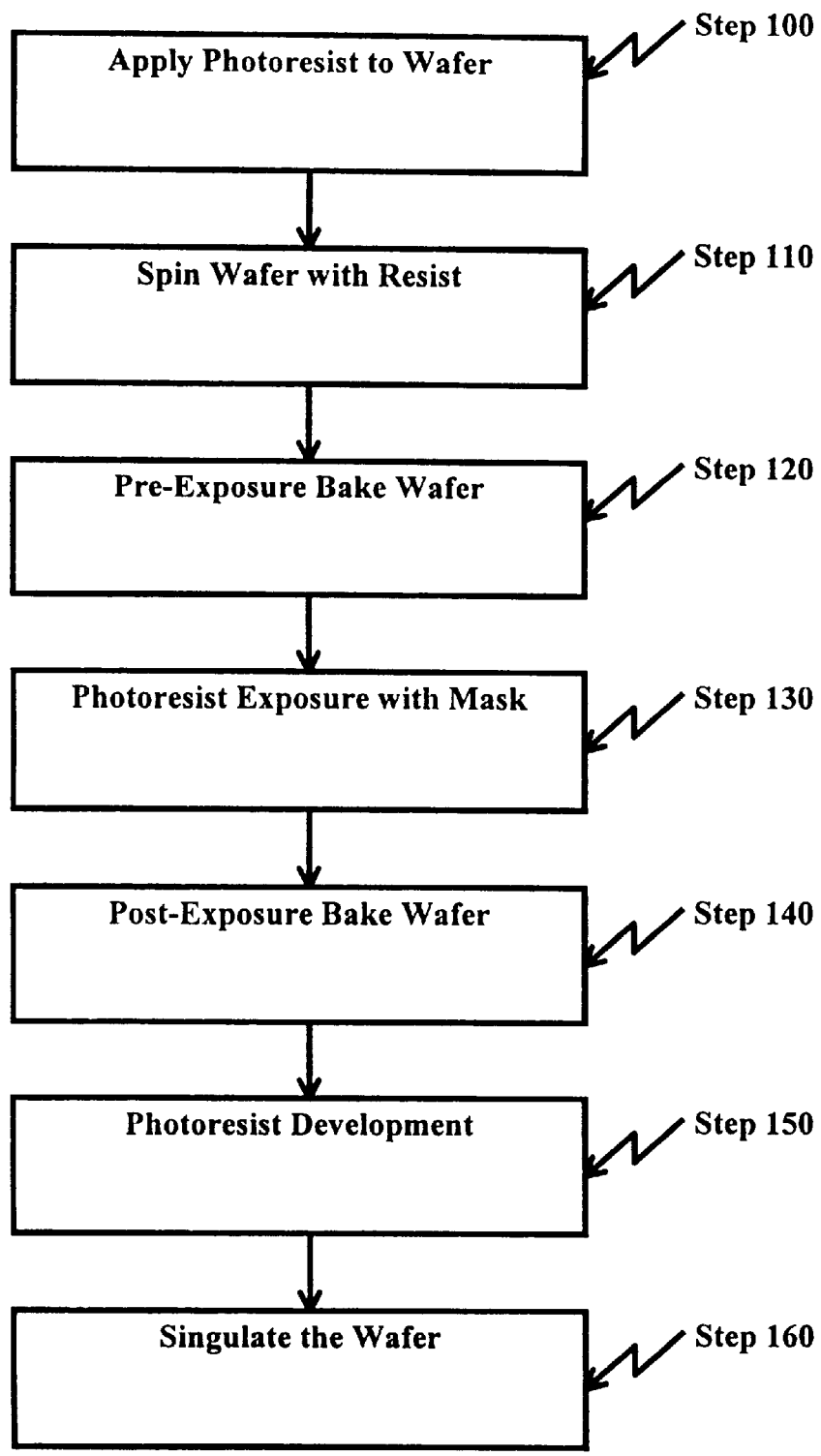
FIG. 1 illustrates a method according to the present invention for manufacturing guides from negative photoresist on a material.

FIG. 1 illustrates a flow diagram of the steps for creating an integral guide on a photonic device according to one embodiment of the present invention. The guide can be an optical fiber guide. Since, no adhesive or other material is used to connect the guide to the photonic device, the guide is integral with the photonic device, i.e., in direct contact with the photonic device. After the process described in FIG. 1, the guide and the photonic device form a single integral device.

In Step 100, a photoresist or other resist material is applied to GaAs or another material such as a semiconductor material. A variety of traditional methods of applying resist to a semiconductor material can be used including using a dispensing tool such as a syringe, spatula, or other application device.

In a preferred embodiment the applied resist material is thick, mechanically stable, and capable of forming substantially perpendicular walls such that the guide created from the resist material has these features. A resist material that satisfies these needs is SU-8, which can form a coating (layer) as thin as 0.0015 inch thick and yet the layer remains substantially non-brittle and non-distortable. Additionally, SU-8 can be used to from thick (high) structures using conventional semiconductor manufacturing apparatuses.

SU-8, an epoxidized novolak, is sold under the tradenames EPON® SU-8 and Nano® SU-8, made by Shell Chemical Company of Houston, Tex., is available from Microlithography Chemical Corp., 1254 Chestnut Street, Newton, Mass. 02164-1418. This photoresist was developed and patented by Gelorme, et al. of IBM Corp., U.S. Pat. No. 4,882,245 for application on printed wiring boards. SU-8 has an epoxide functionality of approximately 8.0, an epoxide equivalent weight of approximately 195 to 230, and a melting point of approximately 77° C. to about 82° C.

SU-8 is an epoxy based negative acting photoresist. That is, the portions of the wafer that are exposed to light covered by SU-8 remains after the development process. SU-8 can be applied to a surface after which portions can be etched away, leaving very small scale structures (micro-structures). SU-8 is photosensitized with a triaryl sulfonium salt. Acceptable solvents for use with SU-8 include gamma-butyrolacate (GBL) available from Microlithography Chemical Corp., 1254 Chestnut Street, Newton, Mass. 02164-1418. Acceptable developers for use with SU-8 include GBL and propylene glycol methyl ether acetate (PGMEA).

The semiconductor material can be any practical size wafer, limited only by the availability of processing devices that can handle various wafer sizes. For example, 1 inch, 2 inch, 5 inch and 8 inch wafers are commonly used today, however, this invention could be utilized on small or larger wafer sizes including non-circular wafers. Preferably, the wafer used in step 100 has photonic devices within it such as surface emitting lasers, Light Emitting Diodes (LEDs), vertical cavity surface emitting lasers, photodiodes, photodetectors, light sensitive devices or other devices for emitting or receiving optical or photonic signals.

In step 110, the wafer with the deposited resist material is then spun at an appropriate rate, approximately 100 RPMs to 5000 RPMs, to form a uniform layer of resist. A consistent rotational speed can be used or a variety of speeds can be used to achieve the desired distribution of resist on the various portions of the wafer. In a preferred embodiment, this step results in the resist material being spread evenly over substantially the entire wafer. Various spin speeds and spin duration can be used to achieve a desired thickness and uniformity of the resist. For example, a wafer can be spun at 1000 RPM (revolutions per minute) for 15 seconds. For a given spin duration, slower spin speeds result in a thicker layer of resist and faster spin speeds result in thinner layers, for a given resist and starting volume. By varying the spin speed and the spin duration, a resist thickness of over a millimeter or less than a millimeter can be achieved. For example, a two inch wafer spun at 1000 RPM for 15 minutes results in 280 microns +/−20 microns of SU-8 resist thickness. The thickness of the resist after the spin step is, of course, dictated in part by the amount of resist that is initially applied to the wafer.

In step 120, the wafer with a substantially uniform layer of resist is then exposed to a pre-exposure bake. The wafer is baked until the resist film does not mark when it is lightly touched by a blunt instrument after the wafer has cooled to room temperature after the bake. For example, a two inch wafer can be baked at 95° C.+/−2° for 60 minutes +/−30 minutes. Initial empirical evidence shows that relatively fewer adverse effects result from over baking than from under baking. Finally, the wafer is allowed to cool to approximately room temperature.

In step 130, the pre-baked wafer is then exposed to a light source with a portion of the area covered by a mask between the wafer and the light source. For example, when SU-8 photoresist is used, a near UV light source approximately 350 to 400 nanometer ("nm") can be used in a contact aligner, such as a Karl Suss MJB-3. The duration of exposure depends on the intensity of the light and the thickness of the resist. For example, a two minute exposure of 400 nm light is suitable for 300 microns of resist.

In step 140, the exposed wafer is then exposed to a two temperature post-exposure bake. This step precedes the photoresist development step 150 discussed below. The post-exposure bake includes baking the wafer at a first temperature ($T_1$) (FIG. 2) for a period of time (0 to $t_1$), then ramping the temperature to a second, higher temperature ($T_2$) during a second period of time($t_1$ to $t_2$). The wafer is baked at $T_2$ for a period of time($t_2$ to $t_3$). See FIG. 2 for an illustration of the post-exposure bake temperature profile.

In a preferred embodiment, $T_1$ (FIG. 2) must not exceed the glass transition temperature (Tg) of the uncured resist. This prevents the resist from flowing and blurring the mask image. For example, SU-8's Tg is approximately 55° C. and $T_1$ can be 53° C. A low temperature bake, that is below Tg, causes some cross-linking (solidification) of the imaged resist. For example, the first post-exposure bake temperature ($T_1$) of 53° C.+/−2° C. lasts 10 minutes. It is desirable to have $T_1$ relatively close to Tg, yet still below Tg.

Figure 2:
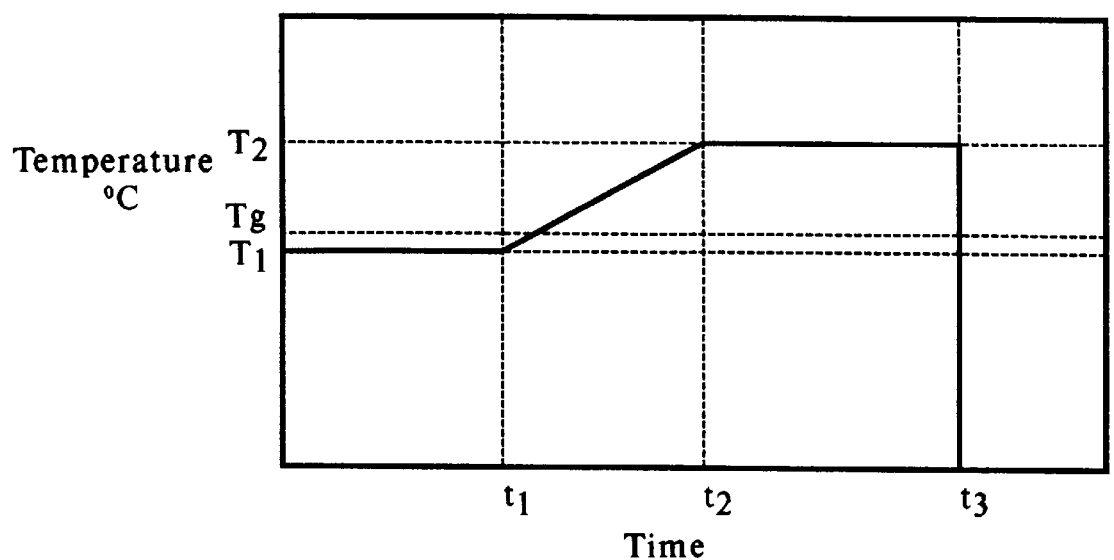
FIG. 2 illustrates a post-exposure bake temperature profile according to the present invention.
Figure 3A:
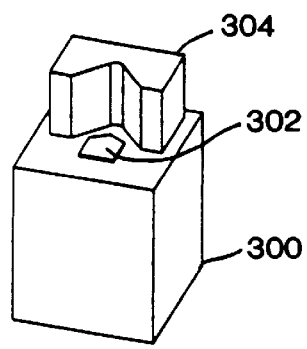
FIGS. 3A, B, C, and D illustrate a singulated photonic device from a semiconductor wafer with a discrete coupling guide structure integrated with the photonic device (top emitting)
Figure 3B:
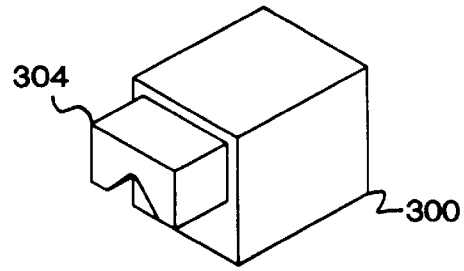
Figure 3C:
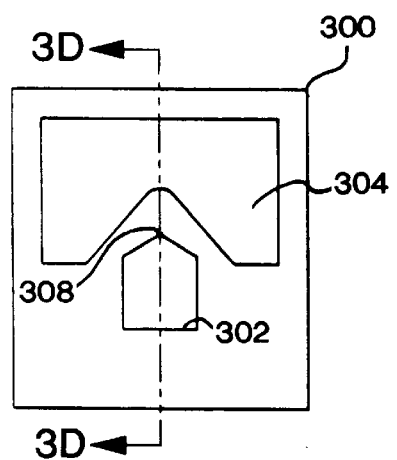
Figure 3D:
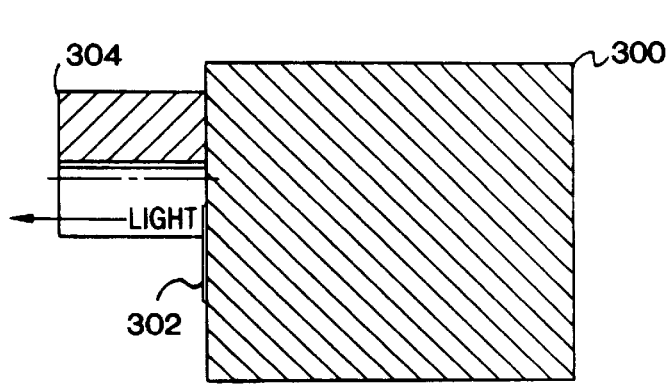
Figure 4A:
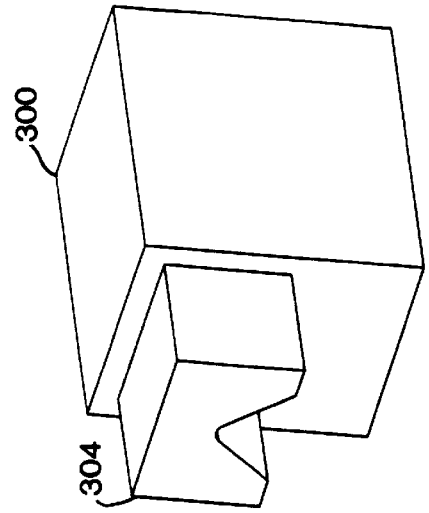
FIGS. 4A, B, C, and D, illustrate a singulated photonic device from a semiconductor wafer with a discrete coupling guide structure integrated with the photonic device (bottom emitting)
Figure 4B:
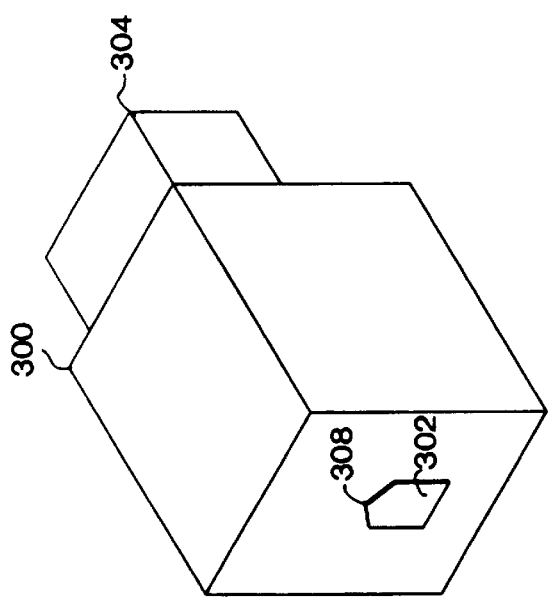
Figure 4D:
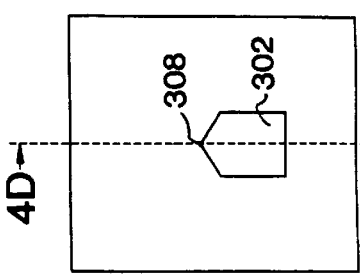
Figure 4C:
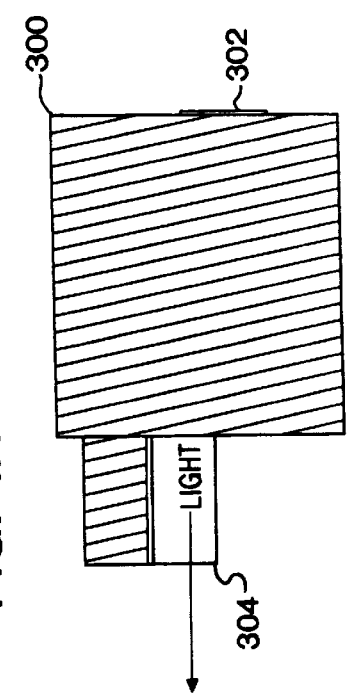

The temperature is then ramped to the second post-exposure bake temperature ($T_2$) over the time period $t_2$ to $t_3$(FIG. 2). For example, a temperature increase from 53° C. to 95° C. over 5 minutes. The rate of transition between the two temperatures depends on the size of the elements being defined, the thickness of the resist, and the environment around the element. For example, smaller elements will move more than larger ones. Thinner resist layers exert less force than thicker layers. An element located relatively far from other elements will swing (shift) more than an identical element that is surrounded by other elements.

The temperature is maintained at $T_2$ for a period of time $t_2$ to $t_3$. For example, 10 minutes. This is the high temperature bake. $T_2$ is higher than Tg.

In step 150, the wafer is developed. The wafer is removed from the post-exposure bake and immersed in a developing solution. Numerous commercially available developing solutions are suitable, such as gammabutyrolacate (GBL) or propylene glycol methyl ether acetate (PGMEA). It is desirable that the wafer be agitated during the development process. It is also desirable that the developing solution be refreshed periodically during the developing process. For example, replacing the developing solution every 3 minutes. Replacing the developing solution tends to enhance the development time. Once the development process is complete, the wafer can be rinsed in the developer and blown dry with nitrogen.

In step 160, the wafer is singulated. That is, components on the wafer are separated for example by dicing with a high speed dicing saw, slicing with a diamond tipped slicing saw, cleaving, or other method.

Following the process described in FIG. 1, the resulting structures have walls that are smoother and straighter than structures made with conventional semiconductor wafer manufacturing processes. The structures have glass transition temperatures (Tg) of up to 200° C. with degradation temperature of approximately 380° C.

Further enhancement of the mechanical properties is achieved by an optional hard bake of 200° C.

FIG. 2 shows an example of a post-exposure bake temperature profile. For example, the profile for a resist with a Tg of 55° C. is $T_1=53°$ C.+/-2° C. and $T_2=95°$ C.+/-5° C., with $t_1=10$ minutes, $t_2=15$ minutes and $t_3=20$ minutes. That is, the wafer is exposed to $T_1$ for 10 minutes, then the temperature is ramped up to $T_2$ over 5 minutes, then the temperature is maintained at $T_2$ for 5 minutes. Finally, the wafer is removed from the heat source and allowed to cool to room temperature.

FIGS. 3A–D illustrate a singulated photonic device 300 made in accordance with the teachings of the present invention. The photonic device 300 includes a laser substrate 302 and a polymer-based microstructure coupling guide 304. The coupling guide 304 is dimensioned to receive an optical signal carrying apparatus such as, but not limited to, a lightpipe, waveguide, optical fiber, or other apparatus suitable for carrying on optical signal. In a preferred embodiment, the laser substrate 302 includes a vertical cavity surface emitting laser ("VCSEL") having a VCSEL aperture 308.

FIGS. 4A–D are views similar to FIGS. 3A–D, except that a bottom emitting photonic device is illustrated.

The photonic device 300 can be a transmitter or receiver of optical or photonic signals. The laser substrate 302 can be Gallium-Arsenide (GaAs), Indium Phosphide (InP), or other suitable material.

Figure 5:
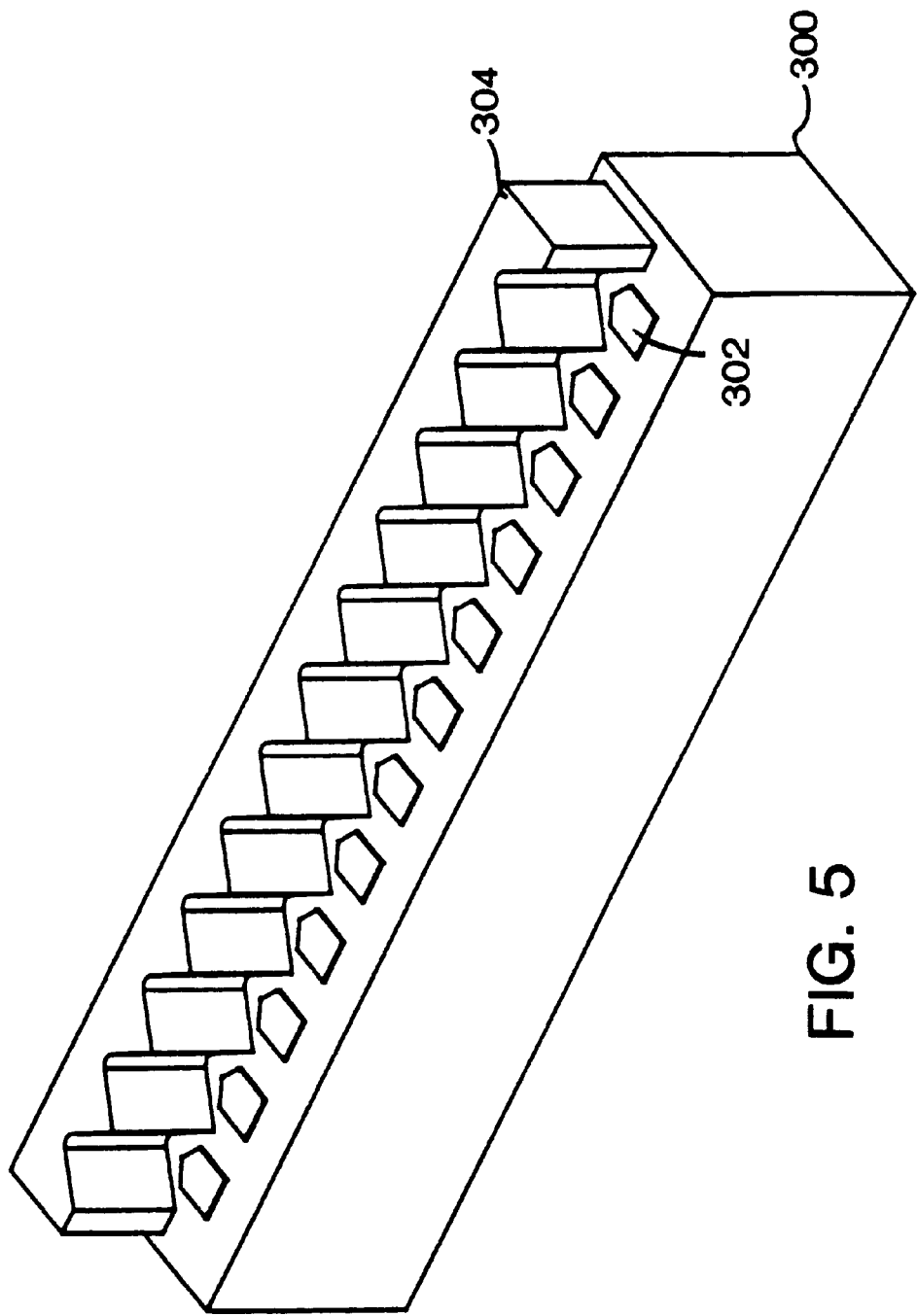
FIG. 5 illustrates a segmented portion of a semiconductor wafer with a coupling guide structure and a plurality of VCSEL apertures.
Figure 6:
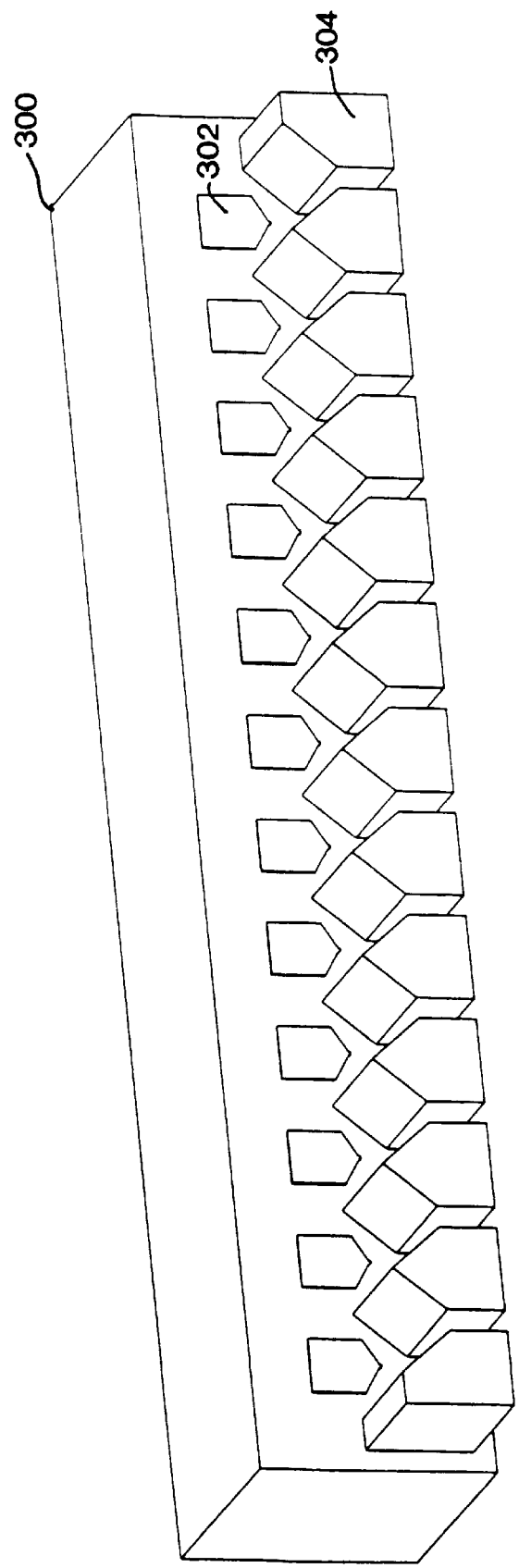
FIG. 6 illustrates a segmented guiding structure for arrayed devices.

FIGS. 5 and 6 illustrate alternate embodiments of photonic devices made in accordance with the teachings of the present invention.

Figure 7:
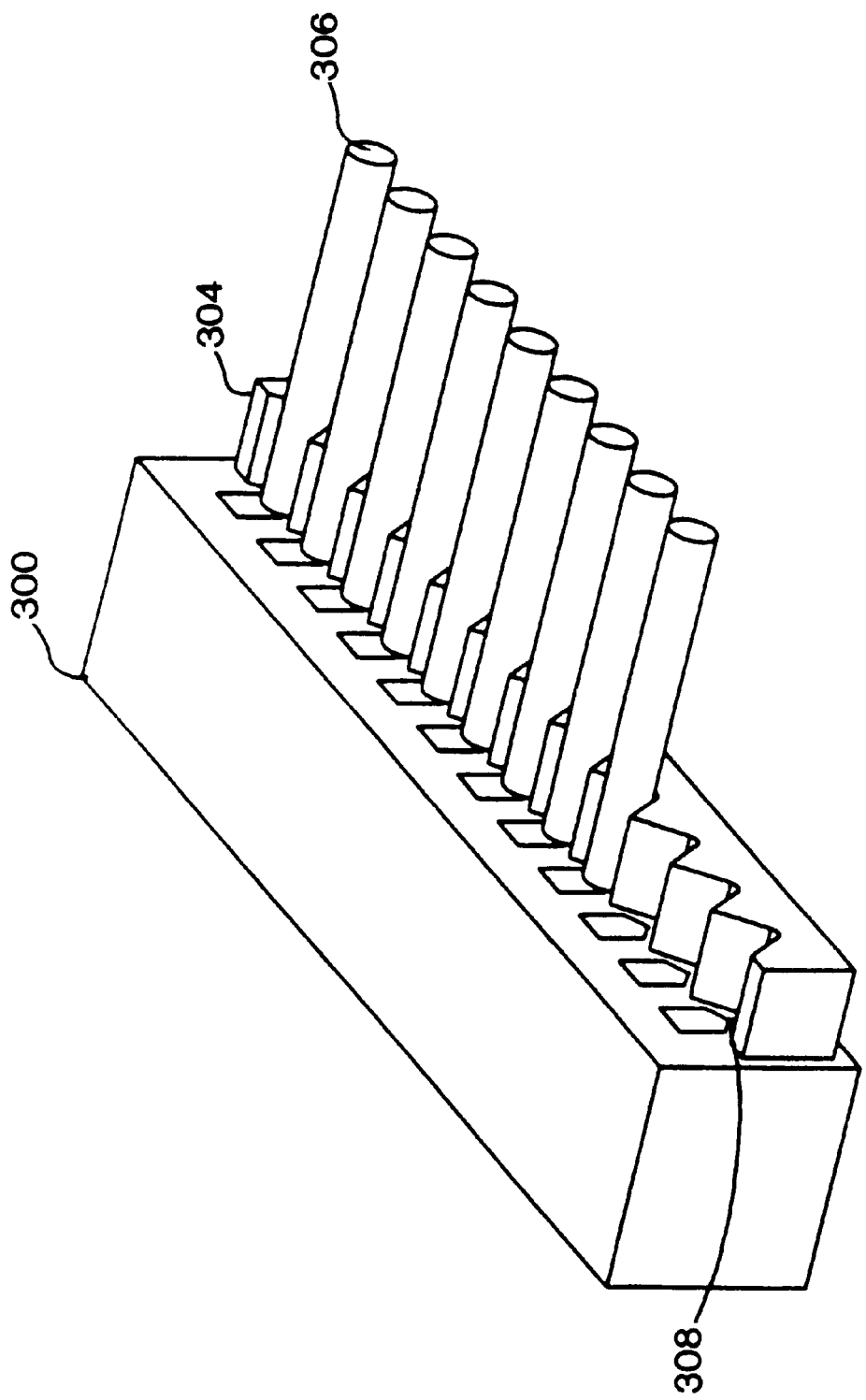
FIG. 7 illustrates a segmented portion of a semiconductor material with a plurality of photonic devices, an integrated guide, and a plurality of photonic fibers.

FIG. 7 illustrates the function of the coupling guide 304, being to provide a reliable and accurate guide for an optical signal carrying apparatus 306, such as an optical fiber for example. The guide 304 is used to guide the optical fibers 306 during the initial insertion and to maintain the position of the fibers 306 relative to the VCSEL apertures 308. The walls of the guide 304 can be "V" shaped, "U" shaped, semicircular, or other shape that provides accurate insertion of the photonic fiber 306 on to the photonic device 300, or maintains the photonic fiber's 306 alignment with VCSEL apertures 308.

Figure 8:
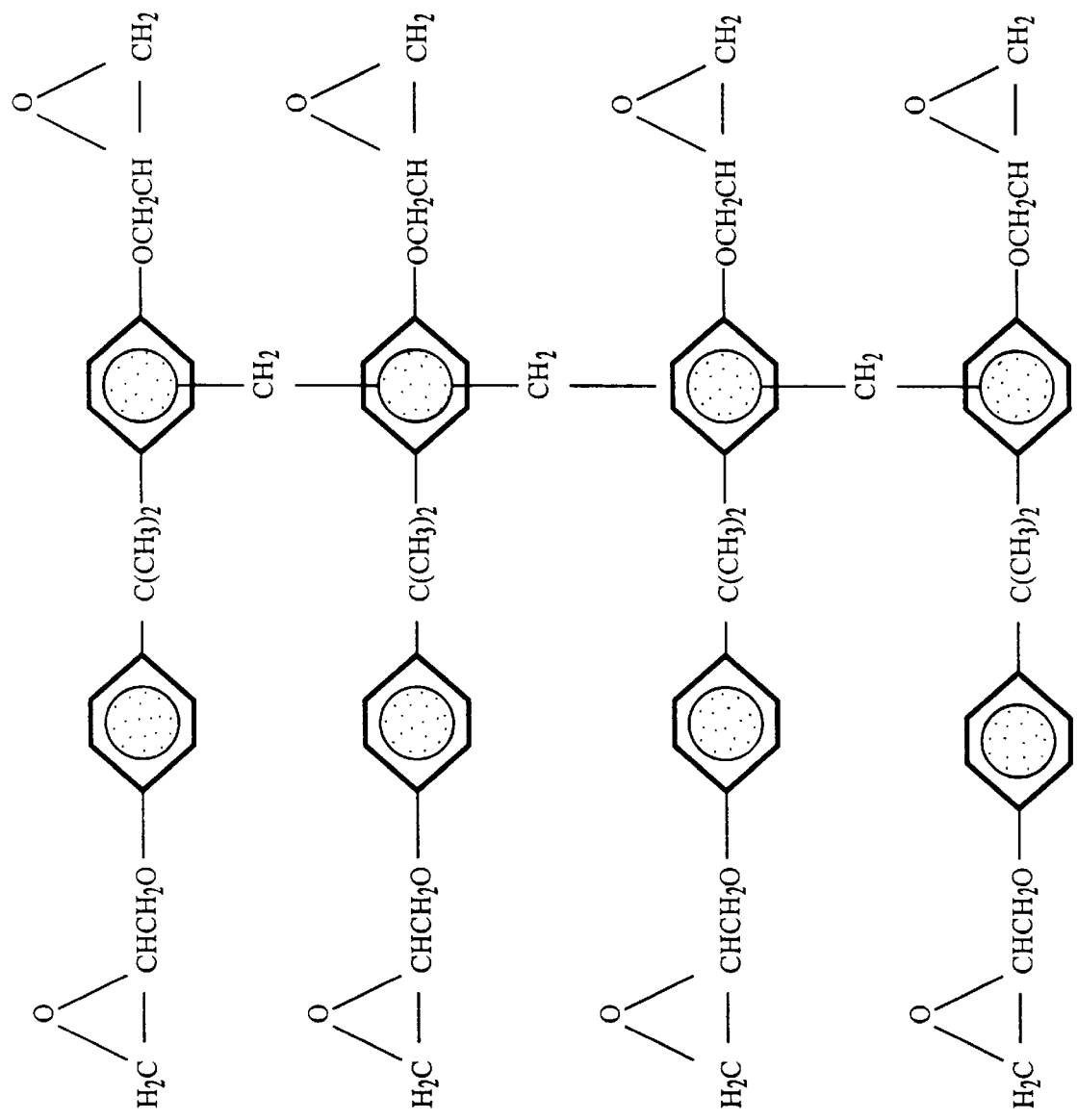
FIG. 8 illustrates the formula for SU-8.

FIG. 8 illustrates the formula for the epoxidized novolak (novolac epoxy), SU-8, as described in U.S. Pat. No. 5,605, 781 at Column 11.

Figure 9:
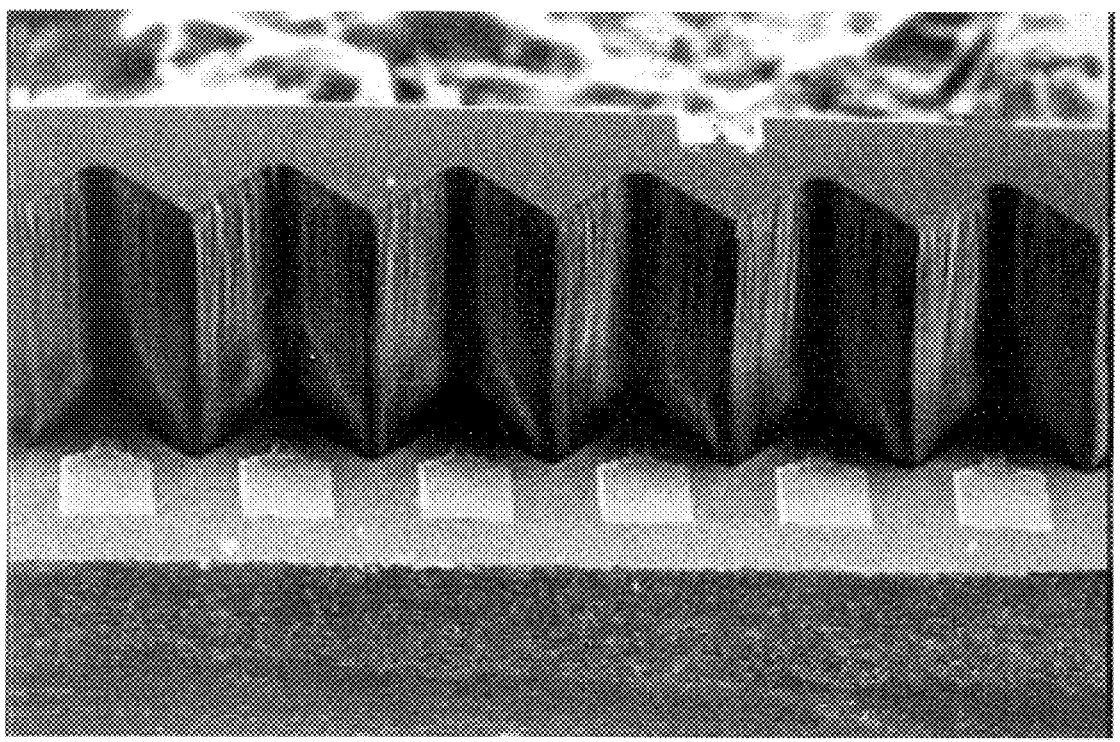
FIG. 9 is a photograph of a structure created with a polymeric material on a semiconductor material.

FIG. 9 is a scanning electromicrograph (SEM) of an isometric view of a structure made of a polymeric material after the process described in FIG. 1. This SEM shows guides formed on a semiconductor material.

Figure 10:
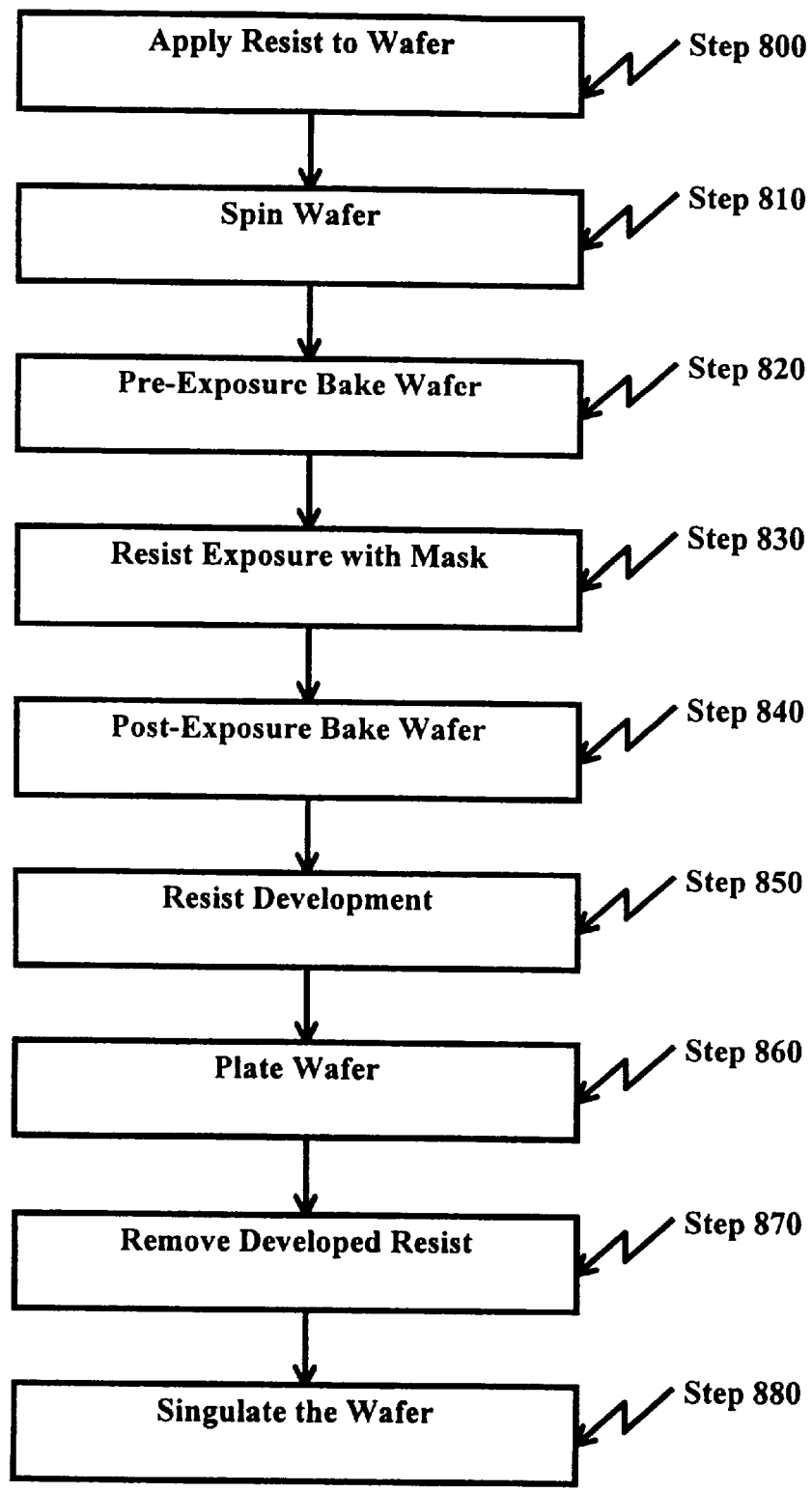
FIG. 10 illustrates a method for manufacturing a plated guide.

FIG. 10 illustrates a plating embodiment of the present invention. Steps 800 through 850 of FIG. 10 correspond to steps 100 through 150 of FIG. 1, respectively. However, the mask in step 830 is a different design than the mask in step 130. The purpose of the mask in step 830 is to leave behind after the development step, step 850, channel(s) for the plating material. After the plating step, step 860, and the resist removal step, step 870, The plated channel(s) form the guide(s) for the fiber(s).

In step 860 the wafer with the developed resist is plated. Plating can include, but is not limited to, electroplating. Appropriate plating materials include metals such as nickel, gold, copper and other metals. The plating step leaves the channels formed in the resist development step, step 850, filled with the plating material.

In step 870 the developed resist is removed by standard processes. Thus, the plating material can be used as guides for the fiber(s).

While a preferred embodiment has been shown and described, it will be understood that it is not intended to limit the disclosure, but rather it is intended to cover all modifications and alternate methods and apparatuses falling within the spirit and scope of the invention as defined in the appended claims or their equivalents.

What is claimed is:

1. An article comprising:
   a photonic device having an optical signal receiving surface and an integral polymeric optical signal conveying element guide, said guide having a first end integral with said surface and a second free end extending outwardly away from said surface, said guide being configured to align and receive an optical signal conveying element.

2. The article of claim 1, wherein a wall of the guide is substantially perpendicular to a substantially planar surface of the article.

3. The article according to claim 1, wherein said integral guide being configured to receive and align a plurality of optical signal conveying elements.

4. The article of claim 1, wherein the integral polymeric guide is V-shaped.

5. The article of claim 1, wherein the photonic device is a light emitting diode.

6. The article of claim 1, further including an optical signal conveying element.

7. The article of claim 6, wherein the optical signal conveying element is an optical fiber or a waveguide.

8. The article of claim 1, wherein the photonic device is a surface emitting laser.

9. The article of claim 1, wherein the photonic device is a photodetector.

10. The article of claim 1, wherein the photonic device is a vertical cavity surface emitting laser.

11. The article of claim 1, wherein the polymeric material includes an epoxidized novolak.

12. An article comprising:

a photonic device having an optical signal receiving surface; and an integral polymeric optical signal conveying element guide, said guide having a first end integral with said surface and a second end extending outwardly away from said surface, said guide being configured to align and receive an optical signal conveying element and being formed by a plating material, wherein a resist is used to form openings which are filled with the plating material before the resist is removed.

13. The article of claim 12, wherein the plating material is deposited by electroplating.

14. The article of claim 12, wherein the resist material includes epoxidized novolak.

15. An article comprising:

a photonic device having an optical signal receiving surface;

an optical element guide formed by a photo-definable polymer material, said guide having a first end adjacent said surface and a second end extending outwardly away from said surface, and being configured to align and receive an optical signal conveying element.

16. The article of claim 15, wherein said guide is V-shaped.

17. The article of claim 15, wherein the photo-definable polymer material includes a negative photoresist.

18. The article of claim 15, wherein the photo-definable polymer material includes an epoxidized novolak.

19. Preparing a photonic device comprising:

applying a polymeric material to a surface of a substrate having the photonic device; and forming an integral guide from the polymeric material on the photonic device, said integral guide extending outwardly from said surface to form a free end and being configured to align and receive an optical signal conveying element.

20. The method of claim 19, wherein the forming step includes reactive ion etching.

21. The method of claim 19, wherein the photonic device is a light emitting diode.

22. The method of claim 19, wherein the guide is configured to receive an optical fiber.

23. The method of claim 19, wherein the guide is configured to receive a waveguide.

24. The method of claim 19, wherein the photonic device is a photodiode.

25. The method of claim 19, wherein the photonic device is a photodetector.

26. The method of claim 19, wherein the photonic device is a vertical cavity surface emitting laser.

27. The method of claim 19, wherein the photonic device is a light emitting diode.

28. A photonic device produced according to the process of claim 19.

* * * * *